Dec. 21, 1926. 1,611,726
W. D. DEWEND
DISK HARROW
Original Filed Oct. 16, 1922 2 Sheets-Sheet 1
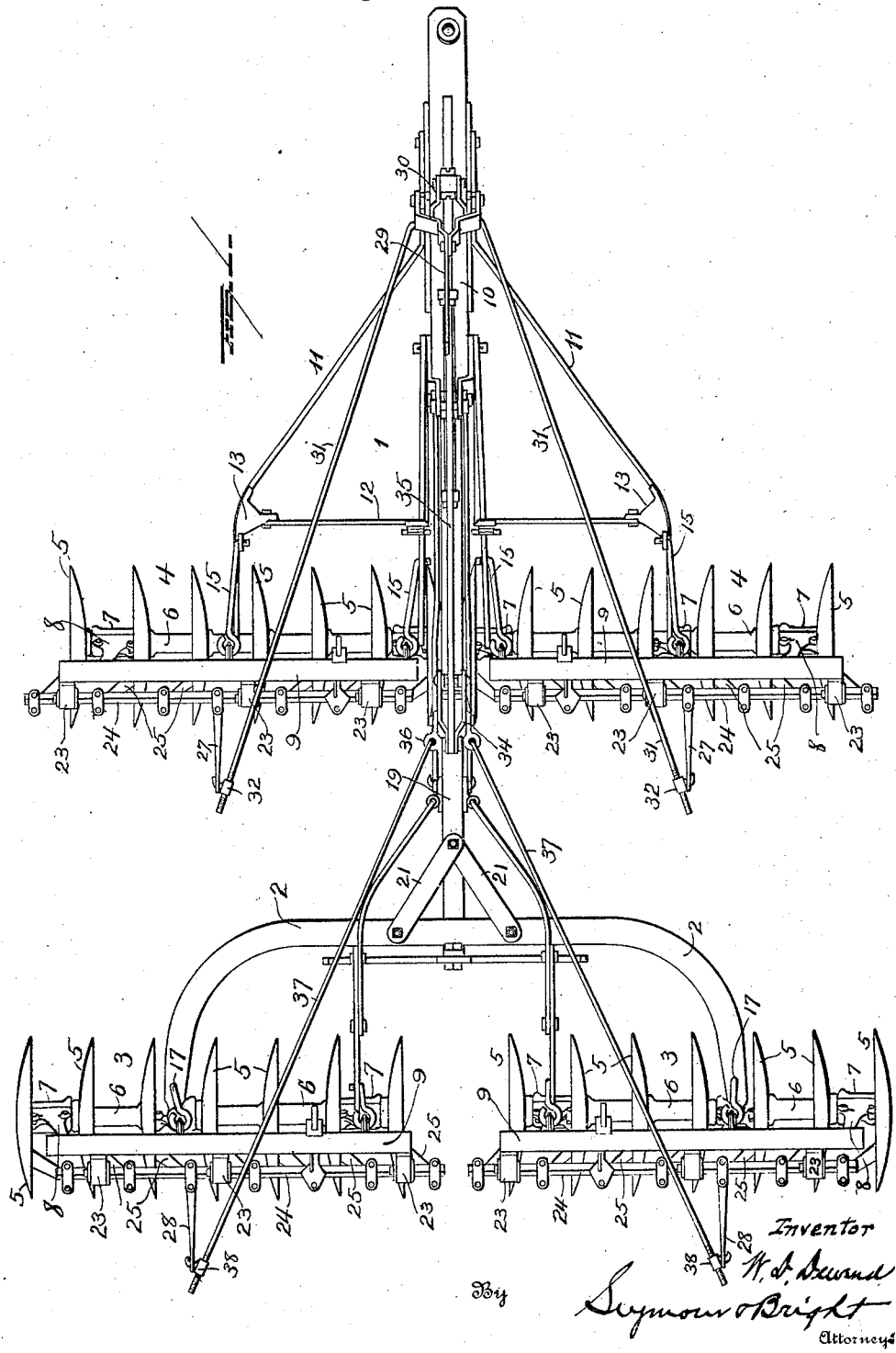

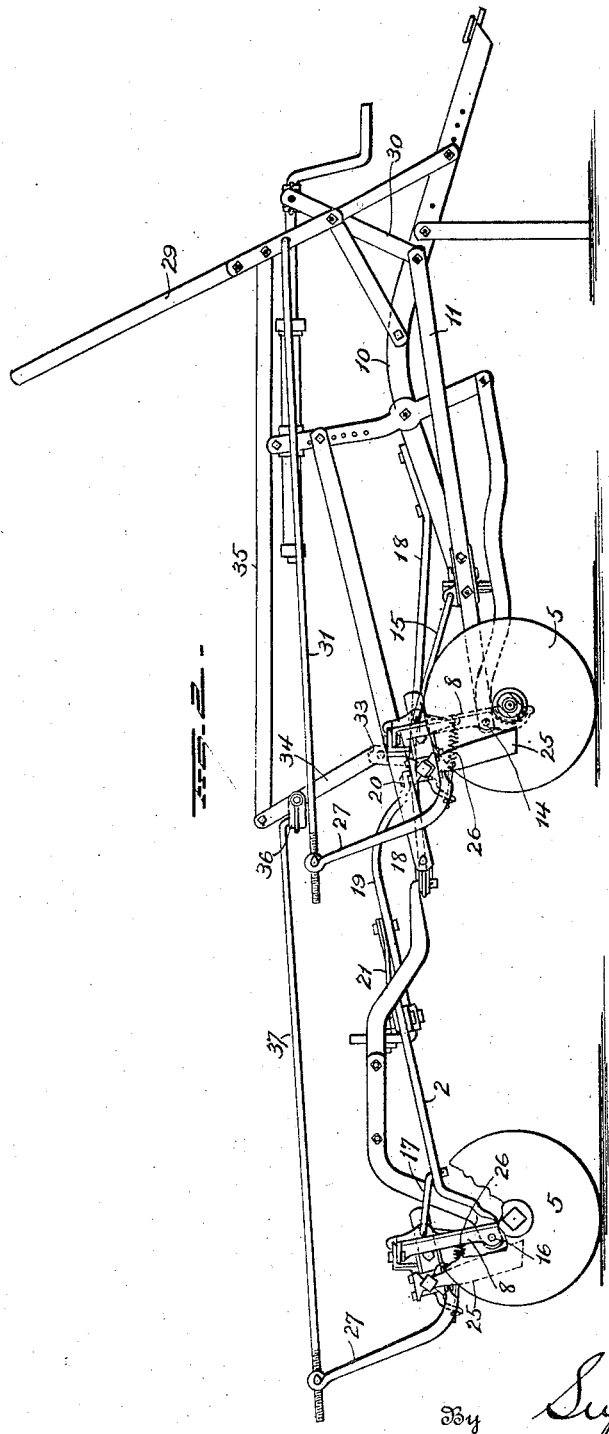

Patented Dec. 21, 1926.

1,611,726

UNITED STATES PATENT OFFICE.

WILLIAM D. DEWEND, OF SOUTH BEND, INDIANA, ASSIGNOR TO OLIVER CHILLED PLOW WORKS, OF SOUTH BEND, INDIANA.

DISK HARROW.

Original application filed October 16, 1922, Serial No. 594,888. Divided and this application filed September 25, 1923. Serial No. 664,738.

This invention relates to improvements in disk harrows, and more particularly to scraper mechanism therefor,—this application being a division of application for patent filed by me on the 16th day of October 1922 and designated by Serial No. 594,888.

One object of the present invention is to provide simple and efficient means for operating the scrapers for the disks of a multi-gang disk harrow of the tandem type.

A further object is to so construct scraper mechanism for a multi-gang disk harrow that the same shall be operable with the use of a single hand lever to simultaneously operate the scrapers for all the disks of both front and rear gangs.

With these and other objects in view, the invention consists in certain novel features of construction and combinations of parts as hereinafter set forth and pointed out in the claims.

In the accompanying drawings; Figure 1 is a plan view of a multi-gang disk harrow showing an embodiment of my invention, and Figure 2 is a view in side elevation of the same.

In the drawings, my improvements are shown applied to a multi-gang disk harrow embodying two main frames 1 and 2, with each of which, two disk gang frames are pivotally connected, the rear gang frames 3, 3 being arranged in tandem with the front gang frames 4, and each of said gang frames includes a suitable shaft on which a plurality of earth working disks 5 are mounted and suitably spaced apart by sleeves 6 and 7,—said shaft or axle being located at the lower ends of standards 8 and the latter are connected at their upper ends by a cross bar 9.

The front frame 1 comprises a draft tongue 10; side bars 11 converging forwardly and secured to the forward portion of the draft tongue 10, and a cross bar 12 extending from one side bar to the other and secured to the same by brackets 13 and to the central portion of said cross bar, the rear end of the draft tongue is secured. Those portions of the frame bars 11 which project rearwardly from the cross bar and its connecting brackets may be parallel with each other and their rear ends are loosely pivoted as at 14 with the lower portions of intermediate standards of the respective front gang frames 4, 4,—said frame bars 11 being loosely connected also with the upper portions of said gang frame standards by means of links 15.

The rear frame 2 of the harrow is made approximately U-shaped and its respective ends are loosely pivoted, as at 16, with the lower portions of intermediate standards of the respective rear gang frames, said frame 2 being also loosely connected with the upper portions of said standards by means of links 17.

A bar 18 is rigidly secured to the draft tongue 10 and constitutes a rearward extension of the same. This bar or rearward extension passes between and rearwardly beyond the front gang frames, and to said bar 18, the forward end portion of a rear draft bar 19 is pivotally connected as indicated at 20, and said draft bar is connected with said frame 2 by means of links 21, 21, as clearly shown in Figure 1.

Brackets 23 secured to the top cross bar 9 of each gang frame, project rearwardly from the same and carry suitable bearings for the accommodation of a shaft 24 to which disk scrapers 25 are secured, and a spring 26 may be connected with the gang frame and with the shaft 24 so as to tend to turn said shaft in a direction to cause the scrapers to move toward the centers of the disks.

The lower ends of levers 27 are secured to the shaft 24 on each front gang frame in proximity to the pivotal connections of said gang frames with the front frame 1 of the harrow, and levers 28 are similarly located on the shafts 24 on the rear gang frames in proximity to the pivotal connections of the latter with the rear frame 2. By locating the levers 27, 28 as above described, there will be but slight movement of their upper ends when the gang frames are being angled or shifted. A hand lever 29 is pivotally connected with a standard 30 at the forward portion of the front harrow frame and to this lever, the forward ends of rods 31 are connected. The rear ends of these rods are threaded and pass through threaded sleeves 32, which latter are pivoted to the levers 27. A bracket 33 is secured upon the draft bar 18 and to this bracket, a lever 34 is pivoted—the upper end of the latter being connected with the hand lever 29 through the medium of a connecting rod 35. A coupling member 36 is pivoted to the lever 34 and with this coupling member, the forward ends of rods 37 are connected—the rear ends of said rods being threaded and connected, through the medium of internally threaded pivoted sleeves 38 with the rear levers 28, said sleeves being pivoted to these levers.

By means of the scraper mechanism above described, manipulation of the hand lever 29 will serve to operate all the scrapers of the disks of both front and rear gangs, simultaneously.

Various changes might be made in the details of construction of my invention without departing from the spirit of the latter or limiting its scope and hence I do not wish to restrict myself to the precise details herein set forth.

Having fully described my invention what I claim as new and desire to secure by Letters Patent, is:—

1. In a multiple-gang disk agricultural implement, the combination with front and rear main frames pivotally connected together, two front and two rear gang frames pivoted between their ends to the front and rear main frames respectively, and disks mounted in said gang frames, of shafts carried by the several gang frames, disk scrapers carried by said shafts, levers secured to said shafts in proximity to the pivotal connections of the gang frames with the main frames, a lever supported by the rear portion of the front main frame, connections between said lever and the levers on the shafts on the rear gang frames, a hand lever near the front portion of the front main frame, a connection between said hand lever and the lever at the rear portion of said front main frame, and connections between said hand lever and the levers on the shafts on the front gang frames, whereby operation of said hand lever will cause turning of said shafts to move the scrapers radially of the disks of all the gangs simultaneously.

2. In a multi-gang disk agricultural implement, the combination with front and rear main frames pivotally connected together, two forward and rear gang frames pivotally connected with the front and rear main frames, disks carried by said gang frames, a shaft mounted on each gang frame, and disk scrapers secured to each of said shafts, of a lever secured to each scraper shaft, a hand lever mounted near the forward end of the front main frame, an intermediate lever mounted near the rear end of the front main frame, rods connected with the intermediate lever and pivotally and adjustably connected with the levers on the scraper shafts on the rear gang frames, a rod connecting the hand lever with the intermediate lever, and rods connected at their forward ends with the hand lever and having pivotal and adjustable connection with the levers on the scraper shafts on the forward gang frames.

In testimony whereof, I have signed this specification.

WILLIAM D. DEWEND.